July 7, 1925.

K. J. E. HESSELMAN

INTERNAL COMBUSTION ENGINE

Filed May 23, 1922    3 Sheets-Sheet 1

1,544,906

Inventor.
Knut J. E. Hesselman,
By
   Atty.

July 7, 1925. 1,544,906

K. J. E. HESSELMAN

INTERNAL COMBUSTION ENGINE

Filed May 23, 1922  3 Sheets-Sheet 2

Inventor
Knut J. E. Hesselman,
By Henry Orth
atty.

July 7, 1925.  1,544,906
K. J. E. HESSELMAN
INTERNAL COMBUSTION ENGINE
Filed May 23, 1922   3 Sheets-Sheet 3

Inventor
Knut J. E. Hesselman
By Henry Ortly atty.

Patented July 7, 1925.

1,544,906

UNITED STATES PATENT OFFICE.

KNUT JONAS ELIAS HESSELMAN, OF SALTSJO-STORANGEN, SWEDEN.

INTERNAL-COMBUSTION ENGINE.

Application filed May 23, 1922. Serial No. 563,084.

*To all whom it may concern:*

Be it known that I, KNUT JONAS ELIAS HESSELMAN, a citizen of the Kingdom of Sweden, residing at Saltsjo-Storangen, Sweden, have invented new and useful Improvements in Internal-Combustion Engines, of which the following is a specification.

It has already been proposed to so construct or arrange the means for admitting the air or a mixture of fuel and air to internal combustion engines that said air or said mixture when entering the cylinder chamber will cause the contents of the latter to perform a rotary movement. By thorough tests I have found, that the angle traversed by the air or air and fuel mixture during the duration of the fuel injecting period is of great importance for a proper distribution of the fuel relatively to the air necessary for combusting same, that is, for the fuel economy, particularly at full load and still more at maximal load, as will appear from the discussion hereinafter made in connection with the description of Figs. 1 and 2 of the accompanying drawings.

The object of the invention is to ensure such a proper fuel distribution by proper adjustment of the speed of the air or air and fuel mixture rotating within the cylinder. In this connection it should be noted, however, that only a distribution in the peripheral direction is concerned.

Figure 1:
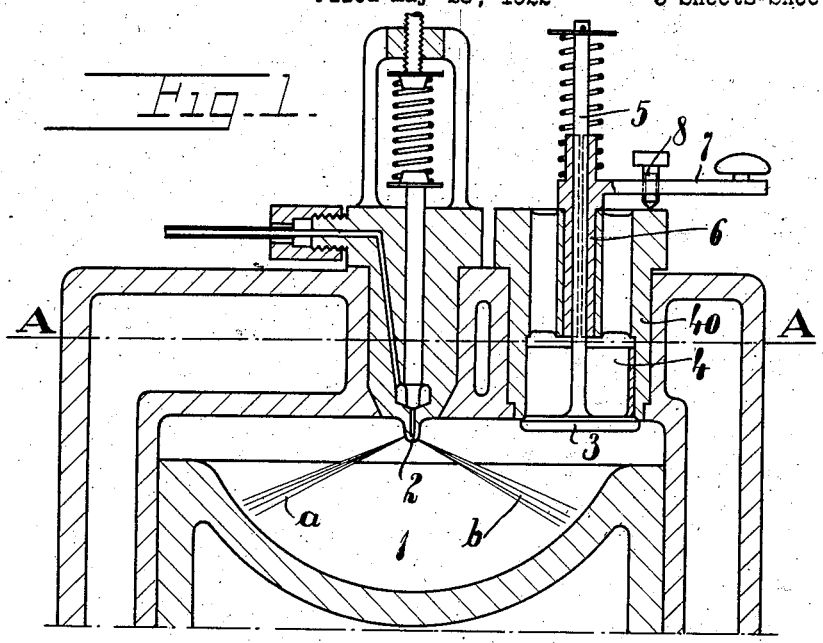
Figure 2:
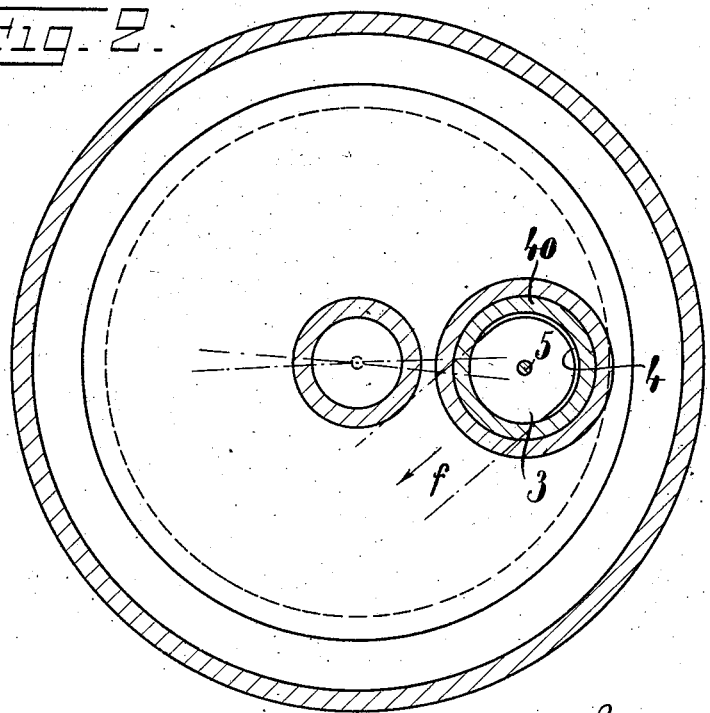
Figure 3:
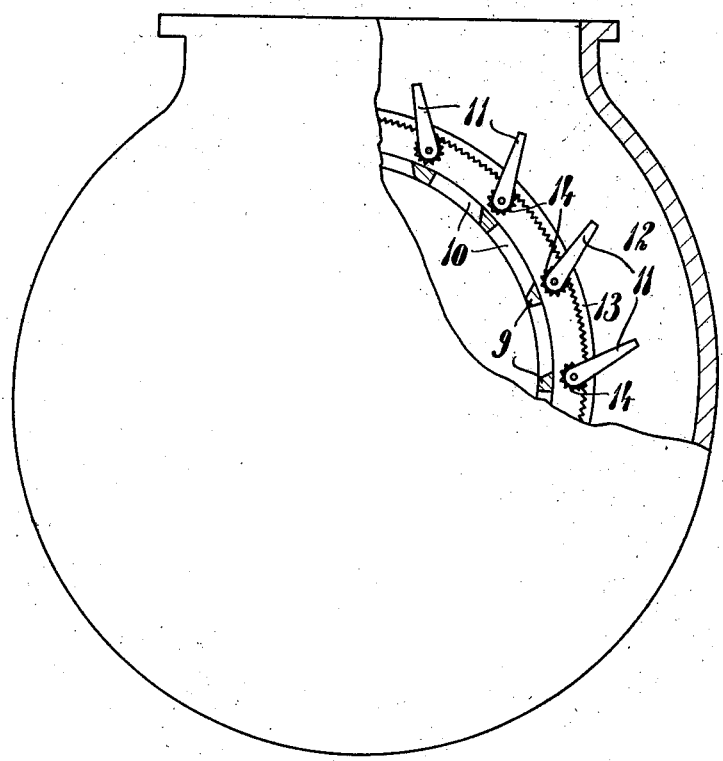
Figure 8:
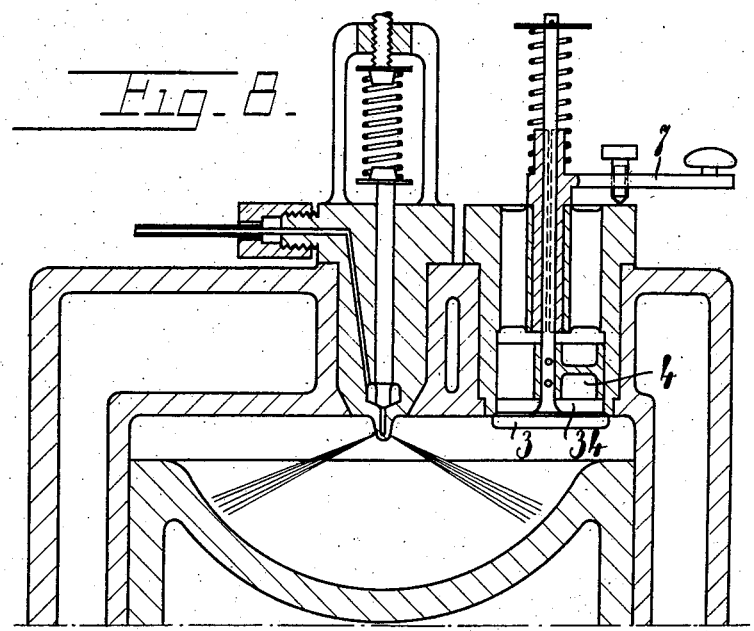
Figure 9:
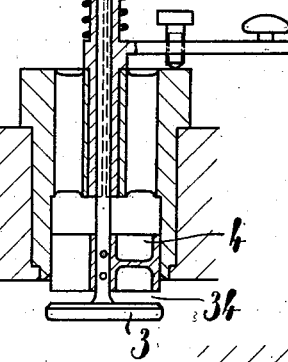
Figure 4:
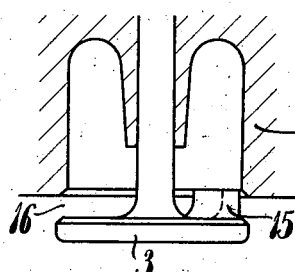
Figure 5:
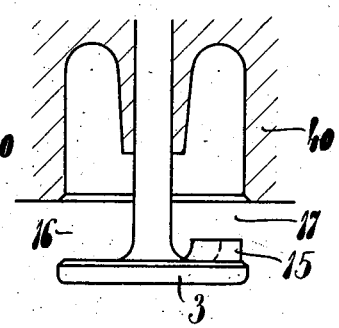
Figures 6, 7:
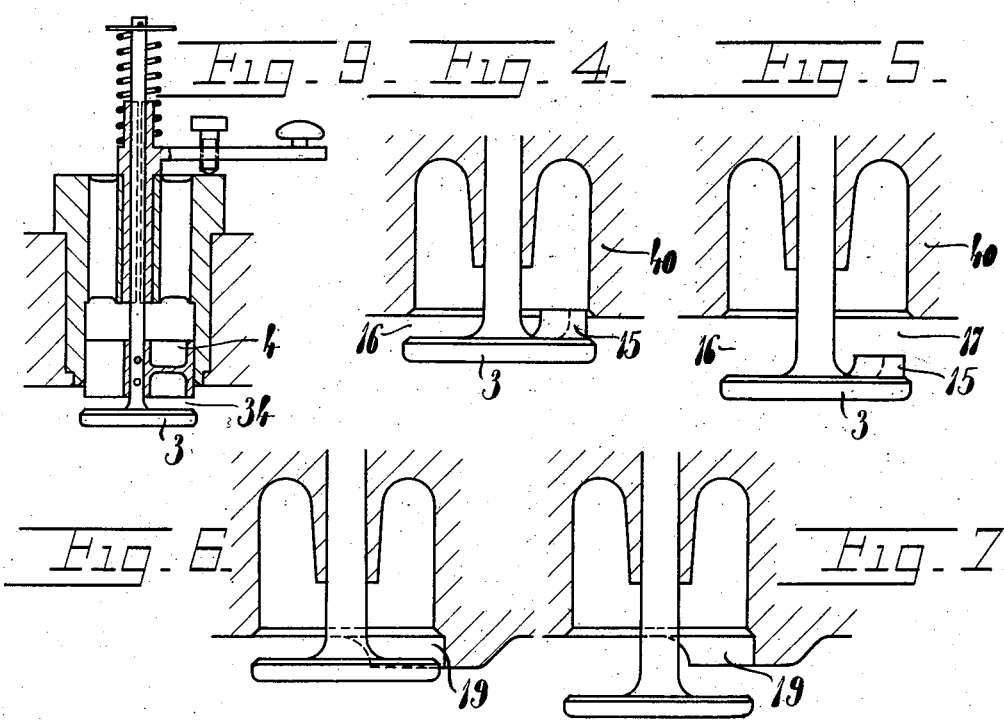

With reference to the accompanying drawing, Fig. 1 is a vertical section of the upper portion of an internal combustion engine constructed according to the principle of this invention. Fig. 2, is a horizontal section taken on the line A—A in Fig. 1 with the fuel valve removed. Fig. 3 is an end view of the cylinder of a two stroke cycle engine constructed according to this invention, with part of the cylinder cover broken away. Figs. 4 and 5 are a vertical section through a modified embodiment of the air valve in partially and completely opened state, respectively. Figs. 6 and 7 show another air valve construction in partially opened and completely opened state, respectively. Fig. 8 is a vertical section through the upper portion of an internal combustion engine having an air valve of still another construction with said valve shown in closed state. Fig. 9 shows a similar section of the air valve in opened state.

With reference to Figs. 1 and 2 of the drawings the principle underlying the present invention will now be explained.

Assume, fuel is injected into the combustion chamber 1 through two diametrically opposite apertures of the fuel injecting nozzle 2 in such a way as to take the shape of two jets $a$ and $b$ which are shown as lying in the same axial plane to facilitate understanding. The air is admitted through the air valve 3 the stem 5 of which carries a shield 4 extending somewhat about half the periphery of the valve and fitting snugly in the boring of the valve housing 40. This shield causes the air when leaving the valve 3 to enter the combustion chamber 1 in a definite direction, as indicated by the arrow $f$ in Fig. 2. The air is thus caused to set up a rotary movement within the chamber 1 about the axis thereof. Assuming the air is rotating 180° during the duration of the fuel injection through the nozzle 2 at maximal load of the engine, it is evident that the fuel will be uniformly distributed around the whole periphery of the chamber 1. In case of a lower relative speed of the air so rotating it will be seen that a sector of the rotating air mass will receive no fuel, that is, the maximum effect of the engine will be reduced. If, on the other hand, the relative speed of the rotating air mass is higher than the said first mentioned speed (for instance 1.5 times the latter) it will be seen that a sector of the air mass will receive too large a fuel quantity (that is, in the example given, one half of the air mass will receive about the double quantity of fuel as compared with the other half of the air mass). In fact, the case is not so simple, as the fuel oil immediately after its injection begins to burn while increasing its volume and pressure. It will thus appear local expansions of the air and gas mass resulting in local volume contractions at other points. In general, however, the above discussion shows what actually takes place.

In case the nozzle 2 is formed with a series of apertures comprising more than two apertures situated at equal angular distance apart and the direction of which forms the same angle with the cylinder axis, the speed of the rotating air or air and gas mixture will be correspondingly decreased. Corresponding to each different number of apertures of the nozzle is a definite optimum speed of the rotary air or mixture. Said speed will in the most cases be equal to the lowest speed possible, that is, the speed at which each oil jet will be passed by the corresponding air sector exactly one time.

The speed of the rotary air may be controlled in many ways, as, for instance:

1. By properly adjusting the speed of the air at its entrance into the cylinder,
2. By properly adjusting the direction of the air at its entrance,
3. By properly adjusting the resistance to which the rotary air is subjected during the compression stroke,
4. By producing two or more air currents having different directions and different capacity which currents will combine in a resulting current of a definite direction.

It is true, that an adjustment of the speed of the entering air may be effected by the aid of appropriate means, said means however will be so complicated as to make an adjustment in this way impractical. An adjustment of the resistance to which the air is subjected during its rotary movement as referred to under the heading 3 will likewise be impracticable. In effecting the control of the speed in question I have, therefore, proceeded on the lines indicated under the headings 2 and 4 above.

An adjustment of the direction according to the statements under the heading 2 may be effected in many ways. In Figs. 1 and 2 of the drawings the air valve 3 is situated near the periphery of the combustion chamber, is rotatably mounted, and is provided with the shield 4 above referred to.

The stem 5 of the air valve 3 is slidably mounted in a sleeve 6 and arranged to rotate with said sleeve. The sleeve 6 carries above the valve casing 40 a handle or crank arm 7 by means of which the sleeve 6 with the valve stem 5 and valve body 3 may be rotated.

To maintain the valve in adjusted position a set screw 8 is screwed through the crank arm 7 and cooperates with the upper surface of the valve casing. Said upper surface may, preferably, have a graduation on it to facilitate exact adjustment of the handle or crank arm 7.

It is true that the exact result of the setting of the air inlet valve into different angular positions cannot be predetermined. Tests made by the inventor have shown that a rotation of the air inlet valve a few degrees will result in a decrease of the fuel consumption by ten per cent or more, and furthermore, it has been established that there will exist a definite position of the air valve that will give a minimum of fuel consumption. According to the above statements this position corresponds to the speed of the rotating air movement in which each fuel jet will be passed exactly one time by the respective air sector.

The embodiment as described above is especially adapted for four stroke cycle engines.

In Fig. 3 I have shown an embodiment especially adapted for two stroke cycle engines. In said last mentioned embodiment a distributor is provided to control the direction of the air entering the combustion chamber of the cylinder. Formed in the wall 9 of the cylinder is an annular series of obliquely arranged air inlet ports 10 and each of said ports has a guide blade 11 individual thereto. The guide blades 11 are positioned within a chamber 12 surrounding concentrically the cylinder wall 9 and being connected to the pressure side of an air pump (not shown). The adjustment of the guide blades to control the admission direction of the air is effected by means of the rotatably mounted toothed rim 13 engaged by pinions 14 secured to the shafts of the guide blades. One of said shafts is connected to a controlling or adjusting device (not shown).

In the embodiments above described the control of the speed of the rotating air is effected according to the method set forth under the heading 2 by controlling the admission direction of the air.

The control or adjustment of the said speed may also be effected according to the method set forth under the heading 4 by dividing the air in two or more currents of different capacity and of different direction. Said currents will then combine in a resulting current of definite direction and speed.

Such a division of the air may, preferably, be effected by means of a shield having both a limited circumferential length and a limited axial length in such a way as to leave a space between it and the valve body or between it and the valve seat in the open position of the valve. In Figs. 4 and 5 an air valve having such a shield is illustrated. Rigidly secured to the air valve body 3 is a shield or flange 15 fitting snugly in the boring of the valve casing 40 and rising to some extent above the said valve body 3. The valve when opened permits the air to first escape at the side thereof opposite the shield 15, that is, through the space 16 in Fig. 4. This will continue until the upper edge of the shield 15 comes out of contact with the lower edge of the valve seat, whereupon the air will escape at all sides of the valve, namely, through a larger space as at 16 and through a narrower space as at 17 (Fig. 5) above the shield or flange 15. This will result in the production of two air currents, that is, one weaker current through 17 and another stronger current through 16.

These two currents will combine within the cylinder chamber in a single current having the same direction as the said stronger current and, provided the air valve is situated as shown in Fig. 1, that is, near the periphery of the combustion chamber, said resulting current will perform a rotary movement within the cylinder chamber. The velocity of said rotary movement depends, of course, on the relative strengths of the two generating currents, or in other words on the dimensions of the shield or flange 15.

As shown in Figs. 6 and 7 a shield or flange 19 is provided on the lower surface of the valve casing or cylinder cover. This flange or shield operates in the same ways as that shown in Figs. 4 and 5. The resulting effect will, of course, in either of the embodiments shown in Figs. 4–6, depend on the axial length and angular length of the shield, and by varying said lengths any desired result may be obtained. In each case it is of importance to guide the valve in any appropriate way so as to ensure the exact position desired of the shield or flange.

It should be noted that further modifications may be made without departing from the idea of the invention.

For instance, the shield 4 in Fig. 1 may be replaced by a shield secured to the valve casing and the axial length of which below the valve seat corresponds to the length of the valve stroke.

It should be noted that the methods as above described to obtain any desired speed of rotation of the air, that is, by controlling the direction of the air admitted or by producing two air currents of different strength may be used in combination with each other. To this end a shield having a limited axial length and a limited circumferential length is provided and so arranged as to be capable of adjustment in peripheral direction.

In Figs. 8 and 9 I have shown one embodiment of such a combined structure. It should be noted that like reference numerals are used to indicate corresponding parts in all of the Figures 1, 8 and 9. The structure shown in Figs. 8 and 9 differes from that shown in Fig. 1 by the fact only that the shield 4 ends at a certain distance from the valve body 3 so as to leave a space 34 between it and the valve body.

The valve when opened permits the air to first escape uniformly at all sides. This will continue until the lower edge of the shield 4 comes to be on the same level with the lower edge of the valve seat. According as the valve is opened beyond said position there will be obtained a correspondingly increased passage at the side of the valve opposite the shield 4 while at the side where the shield is situated a constant passage exists formed by the said space 34. Thus, two air currents having different directions and different strengths will be produced and said two currents will combine in a resulting current in the direction of the stronger generating currents. By properly adjusting the dimensions of the shield 4 and the width of the air space 34 and by properly adjusting the angular position of the shield by means of the handle 7 any desired effect as to the speed of the rotary air movement may be obtained.

In four stroke cycle engines having two or more air valves the arrangement may be such that but one or several of said valves is or are provided with means for producing a controllable rotary air motion.

As regards two stroke cycle engines the following should be noted:

In case the scavenging takes place through valves provided in the cylinder cover, the same means may be used as those used in four stroke cycle engines.

When both ports in the wall of the cylinder and valves in the cylinder cover are used to effect scavenging, the rotary air movement may be ensured by properly designing said ports or said valves or both of them. The most suitable way to proceed on seems to be to use valves for effecting the rotary movement.

When the scavenging is effected through ports formed in the cylinder wall I may use the construction shown in Fig. 3.

When the scavenging is effected through ports having controlling means provided therein means may be provided to cause the said controlling means to let the scavenging take place without any rotary movement during the first part of the scavenging period while towards the end of the scavenging stroke the said controlling means are adjusted to produce a rotary movement of the air. The constructional means necessary for this purpose may take various shapes.

What I claim is:—

1. In an internal combustion engine, the combination with a fuel nozzle having a plurality of apertures, of means for introducing air into the combustion chamber so as to cause the contents of the chamber to perform a rotation with respect to the axis of said chamber, and means for adjusting the speed of said rotation in accordance with the number of apertures of said nozzle.

2. In an internal combustion engine, the combination with a cylinder having a combustion chamber, of means for introducing air into said chamber, said means being constructed to cause the air to perform a rotary movement within the combustion chamber and further constructed to permit any adjustment desired of the speed of said rotary movement.

3. In an internal combustion engine, the combination with a cylinder having a combustion chamber, of means for introducing air into said chamber so as to cause the air to perform a rotary movement therein, said means being constructed to permit variation of the speed of said rotary movement by controlling the direction of admission of the air.

4. In an internal combustion engine, the combination with a cylinder having a combustion chamber, of an air inlet valve situated near the periphery of the combustion chamber and formed with an eccentrically disposed admission port, and means for setting said valve to any angular position desired.

5. In an internal combustion engine, the combination with a cylinder having a combustion chamber, of an air inlet valve situated near the periphery of said chamber at the end thereof, a valve casing, a shield extending about a definite part of the periphery of the boring of the valve casing to restrict the escapement of air at the side where the shield is situated, and means for rotating said valve to set the shield in any angular position desired.

6. In an internal combustion engine, the combination with a cylinder having a combustion chamber, of an air valve situated near the periphery of said chamber and formed with two or more admission ports opening in different directions and having different cross section area.

7. In an internal combustion engine, the combination with a cylinder having a combustion chamber, of an air valve, and a shield secured to said air valve and extending around a part of the periphery of the valve, said shield being constructed to leave an air space between it and the valve body to form at the opening of the valve an admission port narrower than that at the side of the valve opposite the shield.

In testimony whereof I have signed my name.

KNUT JONAS ELIAS HESSELMAN.